United States Patent [19]

Marlett et al.

[11] 4,224,579

[45] Sep. 23, 1980

[54] METAL VAPOR LASER DISCHARGE TUBE

[75] Inventors: Calvin J. Marlett, LaCrescenta; Edwin A. Reed, Upland; Richard C. Johnson; William F. Hug, both of Pasadena, all of Calif.

[73] Assignee: Xerox Corporation, Stamford, Conn.

[21] Appl. No.: 885,839

[22] Filed: Mar. 13, 1978

[51] Int. Cl.$^3$ .............................................. H01S 3/22
[52] U.S. Cl. ........................ 331/94.5 G; 331/94.5 D; 331/94.5 S
[58] Field of Search .................... 331/94.5 G, 94.5 T, 331/94.5 D, 94.5 S; 313/175; 316/2, 28

[56] References Cited

U.S. PATENT DOCUMENTS

| 3,730,606 | 5/1973 | Hernquist et al. | 331/94.5 T X |
| 3,822,086 | 7/1974 | Paik | 313/175 X |
| 3,876,957 | 4/1975 | Thatcher | 331/94.5 T |

Primary Examiner—James W. Davie
Attorney, Agent, or Firm—Irving Keschner

[57] ABSTRACT

An internal mirror metal vapor laser, and in particular, a helium-cadmium laser discharge tube, which is economical, compact and has a relatively long operating and shelf life, the operating life typically exceeding 10,000 hours. A positive column helium-cadmium laser tube of the consumable type and having optical resonator mirrors integral with the tube ends to hermetically seal the tube is provided which includes a relatively large volume cadmium reservoir capable of containing sufficient cadmium for operating life times exceeding ten thousand hours. A heater is applied to the cadmium reservoir for controlling the cadmium vapor pressure. The helium pressure is actively controlled by releasing helium from a high pressure helium reservoir when the helium pressure is less than a predetermined value. This is accomplished by providing a signal representing the sensed pressure of the helium in the laser discharge tube and comparing electronically this signal with a signal representing the pressure of helium at a desired operating condition (reference pressure). If the sensed pressure is lower than the reference pressure indicating a loss of helium gas, a source of electric current supplies current to a heating element which in turn heats a temperature sensitive permeable membrane. The temperature sensitive membrane, which forms a portion of a reservoir containing high pressure helium, allows the helium in the reservoir to leak into the laser tube when heated until the sensed pressure is substantially equal to the reference pressure. A pair of thermistors mounted within the laser discharge tube are preferably utilized to effectively provide the sensed and reference pressure signals. In particular, the thermistors are utilized to compensate the effects of ambient temperature changes, thereby allowing an accurate measure of the laser discharge pressure. A diffusion confinement section and a cataphoretic confinement section are provided adjacent one end mirror and a diffusion confinement section is provided adjacent the other end mirror to protect the end mirrors from condensing cadmium vapor or other damage. A baffle member is placed adjacent the cathode end of the discharge capillary which separates the cadmium condensate from the discharge at the cathode to inhibit entrappment or gettering of helium gas by the cadmium.

6 Claims, 7 Drawing Figures

METAL VAPOR LASER DISCHARGE TUBE

BACKGROUND OF THE INVENTION

Metal vapor laser discharge tubes, although commercially available, have been less than satisfactory when utilized in a machine application. This is paticularly so in the cadmium ion laser that employs helium as an auxiliary gas, the cadmium ion laser emitting light at either 4416 Å in the blue region of the spectrum or at 3250 Å in the ultraviolet region of the spectrum and capable of producing a continuous wave or pulsed output with modest discharge currents.

Degradation of the radiant output to an unacceptable level is the usual definition of laser tube failure. In turn, the intensity of the output radiation varies with the helium and cadmium pressure and the type and concentration of impurities within the tube. The mechanisms for degradation failure in the helium-cadmium laser tubes are therefore related to depletion of the helium or cadmium supply or accumulation of impurities in the tube.

Depletion of the helium supply is, it is believed, usually a result, inter alia, of permeation through the tube seals and glassware, and trapping by the cadmium condensate. In a typical helium-cadmium laser tube with a consumable cadmium supply, permeation rates may be 0.24 millitorr/hour and helium trapping (or gettering) rates by condensing cadmium may be as high as 38 millitorr/hour.

The source of impurities in laser tubes are both internal and external. Inpurities such as hydrogen will increase the conduction and convection cooling losses from the discharge in the capillary bore and thereby cause alteration of the excited state population distribution in the discharge and the laser output. Water vapor impurities generally dissociate in the tube with the oxygen causing oxidation of the cadmium supply and metal structural components. The residual hydrogen from the dissociation adds to the other sources of hydrogen to cause cooling of the discharge. Internal sources of impurities include absorbed and occluded water vapor and noncondensable gases in the glass walls and structure, evaporated or sputtered electrode or other structural materials, and other internal contaminants resulting from improper cleaning or handling of parts prior to assembly. Suppression or elimination of these impurity problems necessitates that the tube be capable of bake-out at high temperatures (350° to 400° C.) since the contamination problems of most concern are internal to the tube. In those laser tubes using epoxy seals to seal the tube ends, external sources of contamination, generally water vapor and hydrogen may enter the tube thorugh the seals, an epoxy seal being very porous. Many or all of the mechanisms for degradation failure exits in present commercial laser tubes whether in operation or during storage (shelf-life).

The above deficiencies in the prior art metal ion laser discharge tubes have caused a limited acceptance of these tubes in the laser industry. An important use of a helium-cadmium laser, for example, would be in the laser reading/writing systems wherein the blue output of the laser can be effectively utilized as one component of a laser beam which scans (reads) an input document or as a writing beam to write (print) information on a medium sensitive to the blue laser light such as a photoconductor.

Therefore, what is desired in a helium-cadmium laser discharge tube is one which, inter alia, provides an increased lifetime by compensating for helium pressure loss; provides an integral mirror structure to minimize inter-cavity optical surface contaminants; provides a laser mirror seal structure which allows bake-out of the tube at the required high temperature to minimize internal tube contaminants; provides a mirror seal structure which is substantially impermeable to external contaminants; provides diffusion and cataphoretic confinement of the cadmium vapor to protect the laser mirrors; provides a relatively large cadmium reservoir capable of containing sufficient cadmium for operating lifetimes exceeding 10,000 hours; and, allows for control of the cadmium vapor pressure to maintain a constant laser power output independent of ambient environment.

A helium-cadmium laser tube which provides these characteristics is disclosed in copending application Ser. No. 823,553, assigned to the assignee of the present invention. Although the helium-cadmium laser disclosed therein has provided excellent performance, it has been determined that an active control technique for compensating for helium loss would be desirable. Further, certain laser tube design modifications were determined to be desirable in order to increase the efficiency of the laser while reducing its complexity and cost.

It is an object of the present invention to provide an improved metal vapor laser which has increased operating and shelf life times.

It is a further object of the present invention to provide an improved integral mirror helium-cadmium metal vapor laser discharge tube which has substantially increased operating and shelf life times than commercially available laser tubes and which is more efficient and less costly than prior art laser tube designs.

It is still a further object of the present invention to provide an integral mirror helium-cadmium laser tube which includes a cadmium reservoir having a volume sufficient to contain enough cadmium for long operating and shelf life times.

It is an object of the present invention to provide a helium-cadmium laser tube wherein the cadmium vapor pressure is actively controllable such that it is substantially independent of ambient temperatures.

It is still a further object of the present invention to provide a helium-cadmium laser tube wherein the helium vapor pressure is actively controlled by controlling the temperature of a permeable member which is operatively associated with helium gas under high pressure and which is utilized to compensate for helium pressure loss in the tube whereby operating (and shelf) life times are substantially increased over prior art laser tubes.

It is still a further object of the present invention to provide a helium-cadmium laser discharge tube which is economical and has long operating and shelf life times.

It is a further object of the present invention to provide an integral mirror, helium-cadmium laser tube which incorporates both cataphoretic and diffusion confinement sections within the tube for inhibiting cadmium vapor from condensing on the laser mirrors.

It is still a further object of the present invention to provide an integral mirror helium-cadmium laser tube which incorporates a baffle member adjacent one end of the discharge capillary for separating cadmium condensate from the discharge at the cathode electrode for inhibiting trapping, or gettering, of the helium by the cadmium condensate.

SUMMARY OF THE PRESENT INVENTION

These and other objects are accomplished in accordance with the general concept of the present invention by providing an internal mirror, metal vapor laser, and in particular, a helium-cadmium laser discharge tube, which is economical, and has a relatively long operating and shelf life time at the desired output performance levels typically exceeding 10,000 hours (shelf-life times may typically exceed three years). A positive column helium-cadmium laser tube of the consumable type and having optical resonator mirrors integral with the tube ends to heremetically seal the tube is provided which includes a relatively large volume cadmium reservoir capable of containing sufficient cadmium for life times exceeding 10,000 hours. A heater is provided in operable relation to the cadmium vapor for controlling the cadmium vapor pressure with an external voltage feedback circuit for maintaining the laser output intensity (power) substantially constant. An improved diffusion confinement section and a cataphoretic confinement section are provided adjacent one end mirror and a diffusion confinement section is provided adjacent the other end mirror to protect the laser end mirrors from condensing cadmium vapor. The laser tube includes a section, or appendage, which contains a high pressure helium gas reservoir comprising a temperature sensitive permeable member. When the helium gas falls below an operating reference level, the permeable member is controlled in a manner whereby high pressure helium is released at a predetermined rate into the laser plasma tube whereby helium pressure loss therein is compensated for, substantially extending the operating life times of the laser discharge tube.

More specifically, there is provided a helium-cadmium laser having at least one anode and cathode disposed within the gas envelope. Integral mirrors are disposed at opposite ends of the gas envelope which are substantially insensitive to misalignment and a hard glass frit seal is provided which fixes the integral mirrors at opposite ends of the envelope to the gas envelope and allows the tube to be out-gassed at desired elevated temperature ranges without damaging or destroying the hermetic integrity of the seal. A relatively large volume cadmium active reservoir is provided which provides a sufficient cadmium supply for substantially long operating life times and incorporates a heater which controls the concentration of cadmium vapor in the cadmium reservoir and discharge capillary tube. In addition, a temperature dependent permeable member is provided to control the flow of high pressure helium into the tube to compensate for normal helium loss in the tube thus maintaining the helium concentration in the envelope. A DC voltage applied between the anode and the cathode electrodes maintains a discharge in the active gaseous medium which results in stimulated emission gain for continuous wave generation of laser light. Cadmium is supplied from the cadmium reservoir in close proximity to the anode and is allowed to flow after ionization by DC cataphoresis in the direction of the cathode during the continuous wave generation of the laser radiation. Thus there is provided a flow over the substantial length of the main discharge capillary tube of a substantially uniform ratio of a mixture of the gas materials (helium and cadmium, in the preferred tube configuration). The cadmium vapor is removed in a tube condensing section from the path of laser radiation after it has flowed over the length of the main discharge capillary tube.

BRIEF DESCRIPTION OF THE DRAWINGS

For a better understanding of the invention as well as other objects and further features thereof, reference is made to the following description which is to be read in conjunction with the following drawings wherein:

FIG. 1A illustrates an alternate arrangement for the helium pressure regulator;

DESCRIPTION OF THE PREFERRED EMBODIMENT

Figure 1:
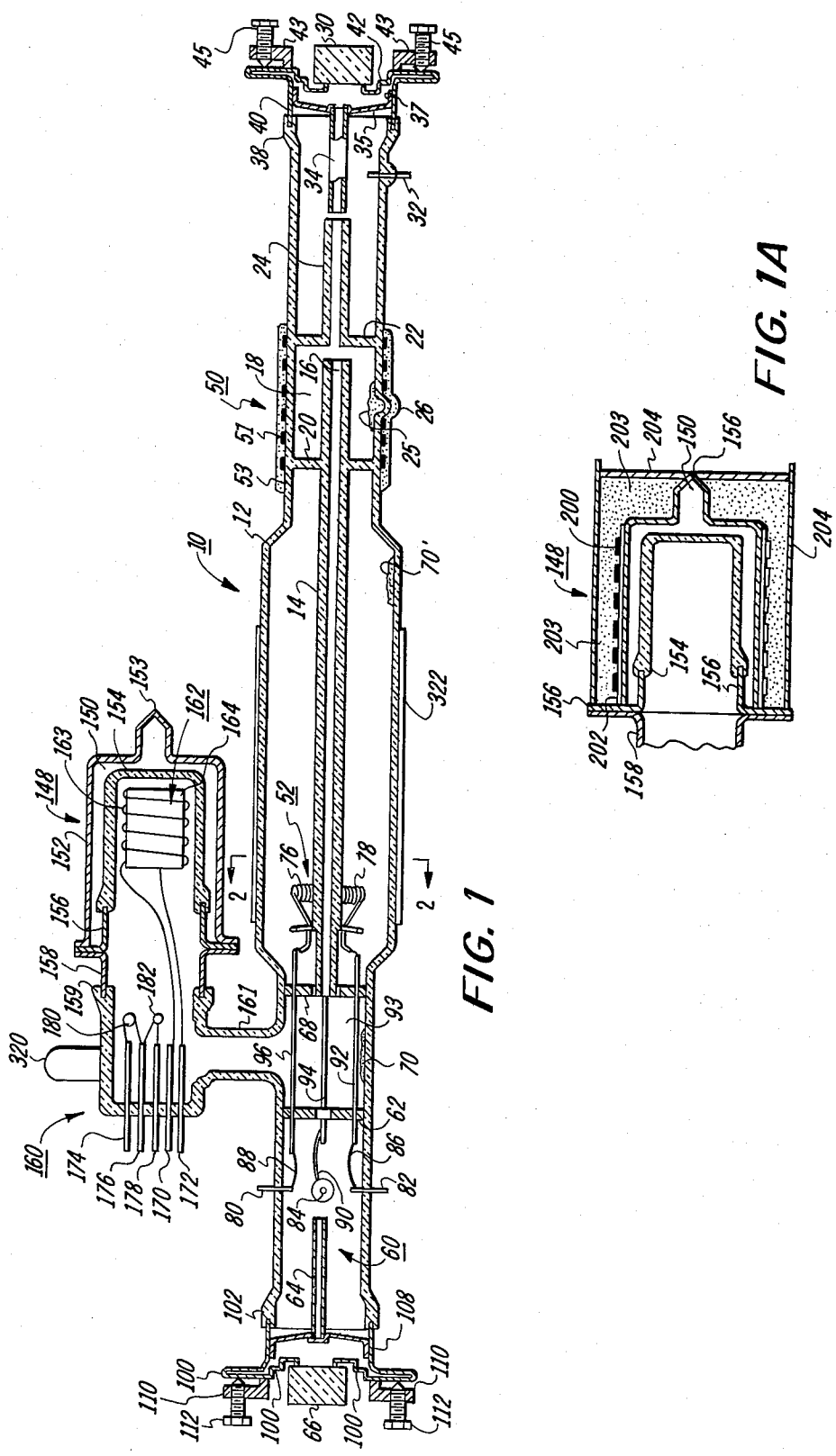
FIG. 1 is a cross-sectional view of the metal vapor laser discharge tube of the present invention.

Referring now to FIG. 1, the metal vapor laser tube 10 which comprises the present invention is shown. The tube comprises a glass envelope 12 with glass main discharge capillary tube 14 having a bore 16 supported therewith. A large volume metal-containing reservoir 18 is formed by glass baffle 20 hermetically sealed to the inner wall of envelope 12 and the disc shaped base portion 22 of cataphoretic confinement capillary tube 24. Baffle 20 also serves to support the discharge capillary tube 14 within envelope 12. The reservoir volume, typically 20 cm$^3$, is capable of containing a sufficient metal charge 25 to provide an operating life time exceeding 10,000 hours. For a helium-cadmium laser, 10-15 grams of cadmium are inserted in reservoir 18 via tubulation 26 prior to tube operation. It should be noted that all glassware described with reference to the laser discharge tube 10, expect for the laser mirror substrate, is preferably made of glass such as Corning 7052 glass. Glass capillary tube 24, adjacent to and coaxial with discharge capillary tube 14, provides cataphoretic confinement of the cadmium vapor in reservoir 18 and primary protection of anode end mirror 30, described in more detail hereinafter.

An anode pin electrode 32, preferably made of Kovar, a conventional iron cobalt-nickel alloy, is positioned within laser discharge tube 10 and adjacent the end of glass capillary tube 24. A diffusion confinement capillary tube 34, preferably made of metal such as Kovar, is formed on the other side of anode pin 32 and is coaxial aligned with tube 24. Tube 34, in conjunction with tube 24, minimizes the amount of cadmium vapor in the region of mirror 30. The tube 34 is supported by a disk shaped metal flange member 35, downwardly extending portions, or tabs, 37 thereof being attached to flange 40. The flared end portion 38 of tube 12 is also sealed to metal flange member 40 by standard glass to metal fusing techniques. An apertured flange member 42 is welded to flange member 40 and the high temperature spherical resonator mirror 30, comprising a glass substrate and a plurality of dielectric reflecting layers is hard sealed to the laser tube body by the techniques described, for example, in copending application Ser. No. 552,396, filed Feb. 24, 1975. An extended adjustment flange 43 is sealed to flange 42 and contains a plurality of adjusting screws 45 to allow mirror 30 to be adjusted for alignment purposes if necessary. An arrangement which may be utilized for this adjustment is disclosed in copending application Ser. No. 850,314, filed Nov. 10, 1977, and assigned to the assignee of the present invention, the relevant portions of which are incorporated herein by reference.

The laser tube described in copending application Ser. No. 552,396 comprises a laser mirror sealed to each end of the laser tube, the seal withstanding relatively high temperature utilized to remove contaminants from the laser tube during fabrication thereof, the sealant also minimizing gas permeation therethrough during the laser tube utilization. This assembly is fabricated by first preparing an apertured recessed metal flange member. A slurry, comprising a glass frit and carrier, is introduced into the metal flange members placed in a first portion of a fixture and a glass substrate having a reflecting layer coated thereon is positioned adjacent the flange member recess with the reflecting member being at least coextensive to that with the aperture. The weighted second portion of the fixture contacts the non-reflecting side of the substrate to ensure that the glass substrate reflecting layer is in contact with the surface of the metal flange member via the dried slurry. The fixture is placed in an oven, the temperature thereof being increased to the fritting temperature of the glass frit for a predetermined time period, the oven thereafter being slowly cooled. The glass substrate is now hard-sealed to the metal flange member, forming the aforementioned assembly, the assembly being joined to a mating flange formed on the laser tube. The reflecting layer is selected to withstand the fritting temperature with minimal optical and mechanical changes, and the glass substrate is selected to retain its mechanical dimension during and after thermal cycling to the fritting temperatures. The glass substrate, the sealant mixture and the metal flange member are selected to have closely matched coefficients of thermal expansion to minimize seal leakage during the laser tube operation. Thus, there is provided a hard glass frit seal which substantially eliminates gas permeation therethrough. The operation and fabrication of this glass frit seal is more specifically defined in the aforementioned pending U.S. Ser. No. 552,396, filed Feb. 24, 1975, the relevant portions of which are hereby incorporated by reference.

A resistive heater 50 comprising a plurlity of coils 51 is wrapped around t he tube envelope 12 adjacent reservoir section 18 and within insulating layer 53 for controlling the cadmium vapor pressure and is utilized in conjunction with a tube voltage detection circuit (described with reference to FIG. 5) to detect the discharge voltage between anode 32 and cathode structure 52 for maintaining a substantially constant laser output independent of ambient environment temperatures. The ends of the heater coils are terminated in appropriate connectors to allow the heater 50 to be connected to a transformer as disclosed hereinafter. On the cathode end section of laser tube 10 is provided a diffusion confinement section 60 having an apertured glass baffle 62 and metal (preferably Kovar) diffusion confinement capillary tube 64 which allows only a vanishingly small amount of cadmium vapor from being in the vicinity of a cathode end mirror 66. A glass baffle 68 is provided (shown in more detail in FIGS. 3 and 4) adjacent the cathode end of the discharge capillary 14 and effectively acts to separate the cadmium condensate 70 from the electric field at the cathode structure 52 (as set forth hereinafter, the cathode structure 52 comprises two cathodes, one of which is utilized for tube operation, the other acting as a spare) to prevent the trapping, or gettering of helium gas by the cadmium which would otherwise occur. It should be noted that this anti-gettering effect provided by baffle 68 allows the cadmium to condense anywhere on the inside wall of envelope 12 between baffles 62 and 68 and be removed from the gas mixture flowing from the bore 16 of main discharge capillary 14.

Figure 2:
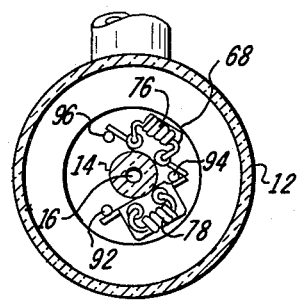
FIG. 2 is a cross-sectional view of the laser tube shown in FIG. 1 along line 2—2 in a direction indicated by the arrows.
Figure 3:
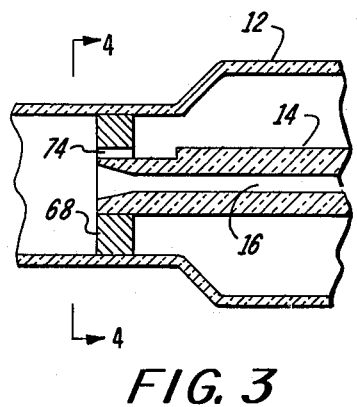
FIG. 3 is an enlarged cross-sectional view of the laser discharge tube showing the cathode end of the main discharge capillary.
Figure 4:
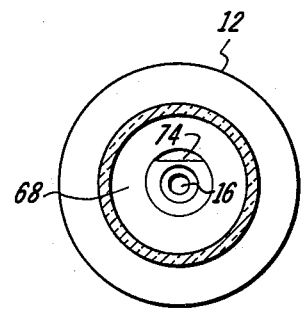
FIG. 4 is an end section along line 4—4 of FIG. 3.

Referring to FIGS. 3 and 4, a champfered section 74 is provided in the cathode end of discharge capillary 14 to allow the discharge exiting capillary discharge tube 14 access to cathode structure 52. The laser tube cathode structure 52, shown in cross-sectional view in FIG. 2, comrpises two resistive heated barium strontium oxide cathodes 76 and 78, one of which functions as a spare, mounted to external pins 80, 82 and 84 for connection to transformer 120 (FIG. 5) via nickel leads 86, 88 and 90 and pins 92, 94 and 96 (made of Kovar), respectively.

High temperature flat resonator mirror 66, comprising a glass substrate and a plurality of dielectric reflecting layers, is hard sealed to apertured metal flange member 100 utilizing the techniques described in the aforementioned copending application. As is set forth in the copending application, by forming a glass seal between the mirror substrate and the apertured metal flange member, the laser tube 10 can be subjected to the high bake-out temperatures required for removing tube contaminants without destroying the glass seal. The flared portion 102 of envelope 12 is sealed to a metal flange member 108 by standard glass to metal sealing techniques and the laser end mirror assembly, comprising mirror 66 and flange member 100, is inert gas welded to flange member 108. An extended adjustment flange 110 is sealed to flange 100, and contains a plurality of adjusting screws 112 to allow mirror 66 to be adjusted. This type of arrangement is disclosed in copending Application Ser. No. 850,314, the teachings thereof being incorporated herein by reference. The joining of laser end mirror assemblies (mirror 30 and flange 42 and mirror 66 and flange 100) hermetically seals the laser discharge tube 10 and provide the optical laser cavity required for lasing action.

Figure 5:
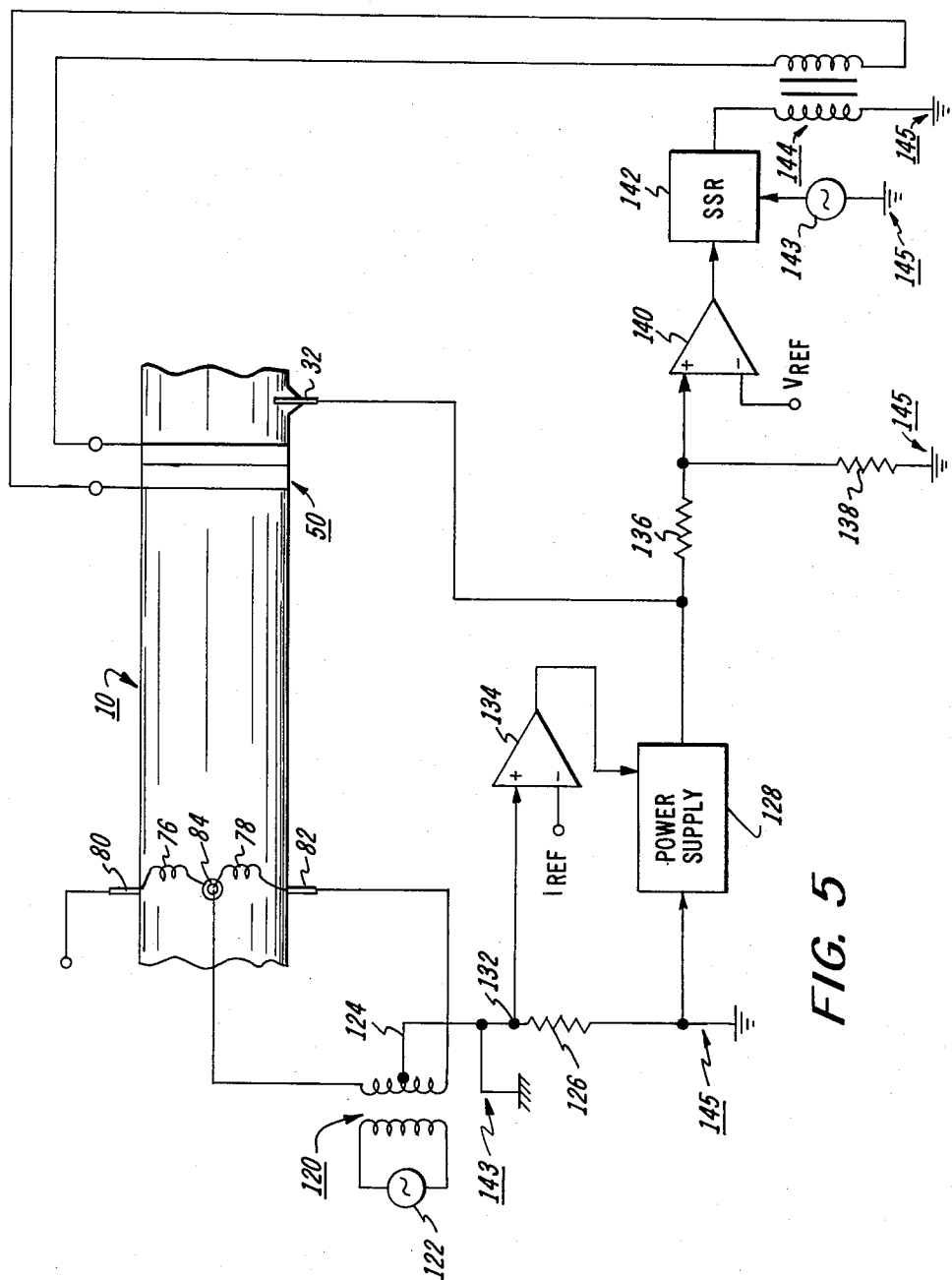
FIG. 5 illustrates the voltage feedback circuit which may be utilized to control the metal vapor pressure, and the control of the laser discharge tube current.

FIG. 5 illustrates in a simplified representation apparatus for controlling the current in the laser discharge tube 10 and for controlling the voltage applied to the input leads of heater 50 to maintain substantially uniform cadmium vapor density within the tube 10. In essence, cathodes 76 and 78 are coupled to feed through pins 80, 82 and 84 in a manner described hereinabove, feed through pin 84 being common to both cathodes. In the embodiment shown, cathode 78 is the cathode selected to be utilized, the output of feed through pins 82 and 84 being coupled to the secondary of transformer 120. The input terminals of the transformer 120 are coupled to a source of voltage 122. As set forth previously, the system is provided with two cathodes 76 and 78 one of which is utilized initially, the other one acting as a spare to be utilized if the primary cathode electrode breaks down. Transformer 120 acts as the heater source for the cathodes 76 and 78 by supplying ac potential across the selected cathode. The selected cathode is also utilized to provide a return path for the dc current in the discharge tube. In other words, the discharge at the selected cathode (78 in the embodiment shown) causes a dc current to be induced in the cathode. The induced dc current is reflected as a dc current through the leads of the secondary of transformer 120. The dc current is summed in the secondary center tap 124 of the transformer 120. Resistor 126, which typically may be 10 ohms, forms a returns path to a voltage power supply 128 and provides an indication of the current through the laser discharge tube 10. In order to maintain the laser discharge current at the desired value, the current is sensed at tie point 132 and coupled to one input of an operational amplifier 134, a reference current supplied to the other input of operational amplifier 134 being compared thereto. If the reference current is less or greater that a desired value (100 ma for example) the output of the operational amplifier 134 adjusts power supply 128 such that the desired current is attained. The output of power supply 128 is connected to anode 32 to complete the discharge path of laser tube 10 and is also supplied to a voltage divider circuit comprising resistors 136 and 138 which are utilized to measure the voltage drop across laser tube 10. The tube voltage drop is a measure of the cadmium vapor pressure in the laser tube 10. Since it is desired to maintain this pressure at a desired value (i.e. $10^{-2}$ Torr, for example) the change of voltage across resistor 138 will provide an indication of cadmium vapor pressure since the tube voltage drop is inversely proportional to cadmium vapor pressure. This signal is applied to the non-inverting input of operational amplifier 140 and compared with a voltage reference $V_{REF}$ applied to the inverting terminal of operational amplifier 140. If the pressure is less than the desired value, as determined by the value of $V_{REF}$, a solid state relay 142 is energized which causes a voltage from source 143 to be coupled to the secondary of transformer 144, the secondary output terminals being coupled to heater 50. When the pressure is less than desired, the voltage drop across resistor 138 increases, causing a positive voltage differential to appear at the input to operational amplifier 140, the output thereof energizing relay 142. Additional cadmium in the cadmium reservoir 18 is caused to be vaporized, thereby increasing the cadmium vapor pressure, decreasing the voltage drop and thereby reducing the voltage differential at the input to operational amplifier 140 to be substantially zero, the relay 142 being deenergized. This removes source 143 from the transformer 144 and thereby deactivating heater 50. The diagram of FIG. 5 also shows a chassis ground 143 and circuit grounds 145. The above is a simplified description of thecadmium vapor pressure control. It should be noted, however, that a time proportional controller along with appropriate lead-lag circuitry can be utilized to substantially improve tube voltage (cadmium vapor pressure) regulation.

As set forth hereinabove, a major cause of failure or limited life of a gas laser tube wherein helium is a constituent gas, such as the helium-cadmium laser of the present invention, is the loss of helium pressure within the gas envelope 12 due to various causes, including permeations through the outer tube walls, condensate trapping or ion implantation into the discharge capillary walls or the cathode. Although typical prior art devices may compensate for helium loss in laser tubes by providing a large helium reservoir, which is directly open to the laser tube to allow additional helium gas therein to flow into the main tube body to reduce the rate of change of laser tube pressure, this procedure is not sufficient to provide accurate control of the helium tube pressure over extended periods of time. Further, although the helium pressure tube implant control technique disclosed in the aforementioned copending application Ser. No. 823,553 provides improved results over the prior art, a more accurate control of helium pressure is desired. In accordance with one aspect of the present invention, a system is provided wherein the helium tube pressure is actively controlled by continuously sensing and adjusting the helium pressure in the laser discharge tube. Referring to FIG. 1, a helium pressure regulator 148 is provided to actively control the helium pressure in the laser tube 10. A high pressure helium reservoir 150 comprises a metal outer member 152, a permeable membrane 154, preferably formed of a permeable glass membrane such as Corning 7052 glass wherein the helium permeation rate therethrough is strongly temperature dependent, and high pressure helium (typically $He_3$ at 2 atmospheres) which is introduced into reservoir 150 via tubulation 153. Membrane 154 is fused to flange member 156 by standard sealing techniques, metal member 152 also being sealed to flange member 156 as shown. An extension, or appendage 160, preferably comprising Corning 7052 glass and connected to the main tube envelope 12 via tube portion 161, is joined to flange 156 via flange 158 which is in turn sealed to the flared end 159 of appendage 160. A membrane heater 162 comprising a heater wire 163 surrounding a heat insulating support member 164 is supported adjacent membrane 154 as shown (it should be noted a source of heat may be applied directly to metal portion 152 in lieu of separate heater 162). When current is supplied to the heater wire 163 in a manner described hereinbelow, the heat generated thereby is sufficient to heat membrane 154 and cause the high pressure helium contained in the reservoir formed by the metal portion, or cover 152, and flange 156 to permeate through membrane 154 at a predetermined rate greater than the rate caused by ambient temperature or other heat effects generated within the laser tube 10 such as the heat generated by the tube discharge, conventional radiation and convection effects etc. The heater leads are connected to feed through pins 170 and 172 as shown which are in turn connected to an external control circuit which will be described hereinafter with reference to FIG. 6. Three additional feed through pins 174, 176 and 178 are provided. Coupled to pins 174 and 176 is thermistor 180 and coupled to feed through pins 176 and 178 is thermistor 182. In the embodiment shown, both thermistors are placed within the appendage 160 although the system would be operative if one of the thermistors was sealed to the outside wall of appendage 160 and connected to the appropriate position in the electrical circuit.

Thermistors, in general, describe an electrical component which may be a semiconductor material normally having a resistance characteristic which is inversely dependent on the temperature thereof. For example, as the temperature of a thermistor increases, its resistance decreases. As will be set forth hereinbelow with respect to the circuitry of FIG. 6, thermistors 180 and 182 are connected in a bridge type circuit in a manner whereby the influence of ambient temperature changes are nulled, thus allowing the sensitive measure of pressure within the low pressure helium section (pressure within laser discharge tube 10, not the pressure of the helium in reservoir 150) utilizing one of the thermistors. In this regard, thermistor 180 is loaded by the circuitry of FIG. 6 with a relatively large current wherein it acts as an active circuit member and is influenced directly by the pressure of the low pressure helium gas within the appendage 160 whereas thermistor 182 is loaded by a much smaller current in a manner wherein the affects of the pressure on its resistance is negligible. As is well known in the prior art, helium gas is essentially a good conductor of heat, the rate of conductance thereof being proportional to its gas density or pressure. The loss of low pressure helium as the tube ages decreases the pressure sensed by thermistor 180 below the nulled, or compensated value determined by the thermistors 180 and 182. As the pressure or gas density of the helium decreases, the rate of heat loss from the active thermistor 180 into the helium gas is decreased, the resistance of the thermistor decreasing. This causes a change in a voltage applied across the active thermistor 180 and causes the heater 162 to be energized, heating membrane 154 and increasing the permeation rate of the high pressure helium from reservoir 150 into the main body of the laser tube 10 to compensate for the decrease in pressure due to helium loss. As set forth hereinbelow, only the active thermistor 180 acts as a pressure sensitive device and the ambient temperature effects are compensated for by both the passive thermistor 182 and active thermistor 180. When the laser is turned off, the laser tube is at ambient room temperature, the permeable membrane 154 being selected such that the helium permeation from the high pressure reservoir 150 into the lower pressure section (initially from the internal area of helium pressure regulator 148 and thereafter diffusing into appendage 160 and the main portion of laser discharge tube 10 via section 161) is negligible. Although when the laser tube is turned on, the permeable glass membrane 154 is heated by convention, conduction and radiation losses from the gas discharge which allows leakage of the helium into the low pressure section, this passive type of regulation, although sufficient for some purposes, does not provide the accurate constant control of laser output power which is required in many applications using helium-cadmium lasers. Therefore, active control of membrane heater 162 is the desired approach. As set forth above, one thermistor may be interior to the low pressure section and the other thermistor can be fastened to its exterior and in substantial thermal communication with the interior thermistor such that the two thermistors respond together through any change in ambient temperature in a manner wherein the influence of ambient temperature changes on the pressure sensitive thermistor 180 are effectively nulled out. However, it has been determined that when using an exterior thermistor, the temperature affects thereon by the glass to which it is coupled i.e., through convection, the radiation effects of the heated discharge, makes the nulling effect more difficult to attain. Other techniques can be utilized to sense the pressure within the low helium pressure section such as by utilizing a pirani gage. Although utilization of the pirani type gage does provide an accurate measure of pressure (temperature) within the low pressure helium section, the gage is a relatively expensive component and would increase the manufacturing cost of the laser discharge tube 10. The thermistors, in contradistinction thereto, are relatively inexpensive devices and provide an accurate indication of helium pressure.

The helium is leaked from the high pressure reservoir 150 into the lower pressure section of the laser discharge tube 10 via glass section 161 at a rate at least equal to the helium loss from the laser discharge tube 10. When laser discharge tube 10 is off, very little helium leakage occurs. When the laser tube 10 is turned on, the tube heats up and helium loss begins to occur by leakage from the laser tube envelope, some trapping by the cadmium condensate and by other means. At the same time, the permeable membrane 154 under active control, provides the primary helium compensation mechanism although some control is provided by the effects of the heat generated by the tube discharge itself.

FIG. 1A shows an alternate embodiment of the helium pressure regulator 148 of the present invention (like reference numerals in FIGS. 1 and 1A identifying identical elements). In this embodiment, the internal heater element 162 is eliminated and replaced with an essentially external heating arrangement comprising a plurality of metal (nichrome) strips 200 wrapped around a dielectric or insulating layer 202, the metal coil arrangement in turn being embedded in a layer of insulating material 203, such as Fiberfrax, manufactured by the Carborundum Company, Niagra Falls, N.Y. A fiberglass sleeve 204 is provided to enclose the underlying structure for protection and heat insulation purposes. Although not shown, the coils 200 are coupled to leads which have been inserted through sleeve 204 and insulating layer 200 and in turn coupled to the circuitry to be described with reference to FIG. 6. In this embodiment, feed through pins 170 and 172 are not required although for manufacturing purposes they are generally included since a six pin stem press is readily available commercially. As described with reference to FIG. 1, the assembled helium pressure regulator 148 is affixed to flange member 158 of appendage 160.

Figure 6:
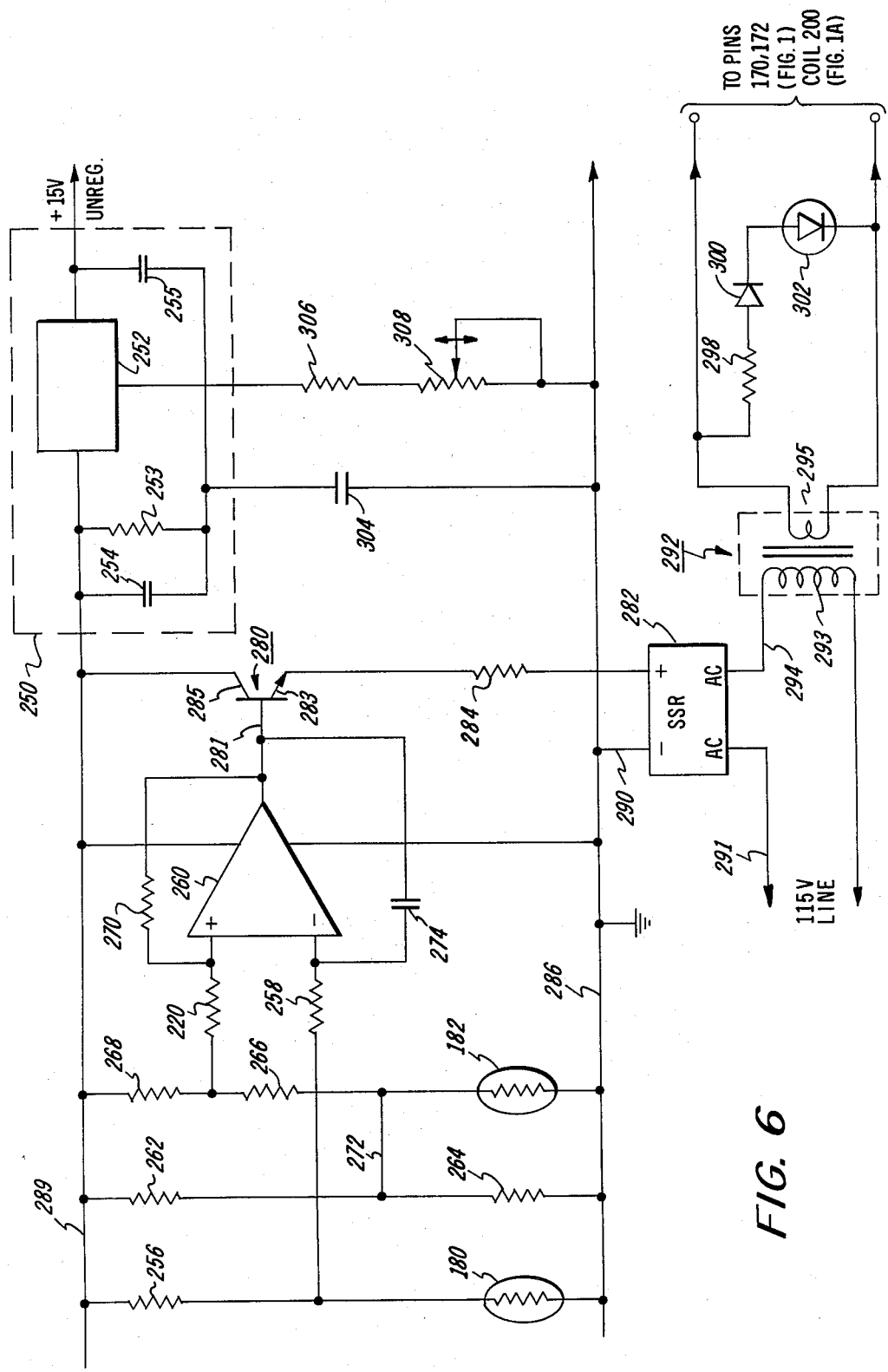
FIG. 6 is a schematic diagram of the preferred circuit for actively controlling the helium pressure within the laser discharge tube shown in FIG. 1.

The schematic circuit for controlling the helium tube pressure is shown in FIG. 6 and will now be described. A source of unregulated 15 volts (not shown) is applied to a regulator circuit 250 which comprises voltage regulator chip 252, resistor 253 and stability providing capacitors 254 and 255. The regulator circuit 250 converts the 15 volts unregulated dc potential applied thereto into a regulated voltage of approximately 10 volts dc. The regulated output is applied across resistor 256 one terminal of which is connected to pressure sensor thermistor 180 as shown. The tie point between resistor 256 and thermistor 180 is coupled via resistor 258 to the inverting input of operational amplifier 260. The ten volt regulated output is also shunted by the series connection of resistors 262 and 264. A resistor 266 is coupled to the tie point of resistor 268 and resistor 220, resistor 220 being the input resistor to the non-inverting input for operational amplifier 260. The output of operational amplifier 260 is fed back to the input thereof via feedback resistor 270. Resistor 266 is connected to thermistor 182, functioning only as a temperature sensor, resistor 262 and resistor 264 via lead 272. A capacitor 274 is provided between the output and input of operational amplifier 260 to reduce the frequency response thereof to reduce the affects of noise on the operation of amplifier 260. The output of operational amplifier 260 is connected to the base electrode 281 of NPN transistor 280, the emitter electrode thereof being coupled to the positive input of a solid state relay 282 via resistor 284. The collector electrode 285 of transistor 280 is connected to the regulated voltage line 289. The negative input of solid state relay 282 is coupled to the circuit common 286 via lead 290. An ac terminal of relay 282 is coupled to an ac 115 volt source via lead 291, the other ac terminal being coupled to the primary winding 293 of a step down transformer 292 via lead 294, the secondary terminal winding 295 thereof being connected across resistor 298, diode 300 and light emitting diode 302. The output appearing across the secondary winding 295 of transformer 292 is also applied to the helium heater 162 via feed through pins 170 and 172 as shown in FIG. 1 or to the leads connected to the heating coil 200 of the FIG. 1A embodiment. Elements 253, 254 and 255 of regulator 250 are coupled to common 286 via ripple reducing capacitor 304 and also coupled to common 286 via resistor 306 and adjustable resistor 308. Adjustable resistor 308 enables the desired helium pressure value to be attained.

Both thermistors 180 and 182 are supplied current from regulated voltage source 250 and through individual current limiting resistors 256, 268 and 266. The resistance value of resistors 262 and 264 are chosen such that the temperature voltage characteristics of thermistors 180 and 182 are substantially matched over a selected temperature range (for example, 60° F. to 120° F.) whereby substantially equal input voltages are applied to resistors 220 and 258 (these voltages essentially appear at the inputs of operational amplifier 260 since the voltage drops across resistors 220 and 258 are relatively small) at the nominal operating helium pressure within laser discharge tube 10. The thermistor voltage drops are compared by operational amplifier 260, the output thereof being fed to solid state relay 282 via transistor amplifier 280, the amplifier 280 operating to amplify the output current of the operational amplifier 260 to drive solid state relay 282. The relay, when energized, drives the helium heater 162 via the transformer 292 to enable high pressure helium to leak into the main body of laser tube 10 as described hereinabove. Light emitting diode 302 provides a visual indication when the helium heater 162 is being operated. In order to set the system circuitry to eliminate tolerance problems of the laser tube and its associated electronics, the laser discharge tube 10 is initially filled with helium at the desired pressure (i.e. approximately 4 Torr) through tubulation 320. The reference pressure is initially set equal to the sensed pressure by moving the adjustable tap of resistor 308 until heater 162 turns on, the tap thereafter being slightly backed off from this setting. If the helium pressure in the tube 10 drops below the adjusted value when the tube is in operation, the tube is allowed to fill at a predetermined rate with the high pressure helium from reservoir 150 until the operating pressure is reached at which point the filling is terminated. The thermistors 180 and 182 are temperature sensitive devices and thus if the temperature within the appendage 160 changes, both thermistors will react with a substantially zero difference in the individual voltage drops. However, since both devices are within the appendage 160, it is desired to have one thermistor sensitive primarily to pressure, and the other thermistor sensitive primarily to temperature. In order to provide this function, it is required that the pressure sensitive thermistor 180 be supplied with a relatively high current when compared to that supplied to the passive thermistor 182. Resistor 256 is therefore selected to provide a high current through thermistor 180 (typically 20 ma) whereas resistors 268 and 266 (which together with thermistor 182 form a compensating circuit) supply a current through thermistor 182 which is substantially less than the current flowing through thermistor 180 (typically 0.2 ma). Adjusting the reference pressure in the manner set forth hereinabove allows the initial operation of the system to be adjusted such that the differential input to the operational amplifier 260 is equal to substantially zero although thermistor 180 is heated to a much higher temperature than thermistor 182 due to the heat causing current flowing therethrough. In other words, thermistors 180 and 182 are arranged in a null type bridge circuit wherein the difference in current flowing through the thermistors at ambient temperature such that initially no voltage differential is applied to operational amplifier 260. In this situation, amplifier 280 is non-conducting and relay 282 is arranged such that the 115 volt line voltage is not coupled to transformer 292. As set forth hereinabove, helium gas is considered a good conductor of heat, the heat conductivity being proportional to the helium density (the number of helium atoms per cubic centimeter). Therefore, in the initial or equilibrium setting, the voltage on regulated voltage line 289 is adjusted by adjustable resistor 308 such that voltage appearing at each input terminal of operational amplifier 260 is substantially equal. It should be noted that when the voltage on line 289 is adjusted in magnitude in one direction (i.e. a higher or lower voltage from an initial value) the voltage drop across thermistor 182 will follow that voltage direction whereas the voltage drop across thermistor 180 will initially follow the voltage direction on line 289 but subsequently (due to its current heating) will change in the opposite direction. Therefore, adjustment of resistor 308 should be made carefully such that the inputs to operational amplifier 260 are substantially equal. However, when there is a loss of helium gas, and since thermistor 180 is heated by the current therethrough to a much greater degree than thermistor 182, the change in helium pressure (or gas density) causes the heat loss from the thermistor 180 to the helium gas to be much greater than that from thermistor 182. When the helium pressure is decreased, the amount of heat loss decreases from the thermistor 180, its temperature increases, its resistance decreases and the voltage drop across thermistor 180 decreases and the negative differential input appears at the input to operational amplifier 260, the positive output thereof driving transistor 280 on. Operational amplifier 260 is preferably arranged to be either "on" or "off", toggle resistor 270 forcing the switching to occur when the voltage difference at the inputs to operational amplifier 260 approach zero. In other words, a predetermined voltage difference is necessary to cause switching to occur to inhibit noise and slight current drifts from causing premature switching. In particular, toggle resistor 270, in conjunction with the adjustment of resistor 308, produces a hysteresis effect wherein the helium pressure must change a predetermined amount (0.05 Torr, for example) before the helium control circuit arrangement shown in FIG. 6 will be operative to compensate for helium pressure loss. As set forth hereinabove, this will reduce the effect of noise on switching and also increases reliability of the circuit components. However, the control arrangement will also be operative without toggle resistor 270 when the helium pressure decreases below the initial helium fill pressure. The "on" or high output of transistor 280 causes relay 282 to switch to an "on" position which therefore couples the 115 volt line current to transformer 292. The secondary 295 of transformer 292 applies voltage to the terminals of heater 162 to heat the permeable member 154 (FIG. 1 embodiment) and allowing high pressure helium to leak into the main portion of laser discharge tube 10 at a rate determined by the properties of the membrane glass (permeability as a function of the membrane temperature) and the heat generated by the heater 162 (in the FIG. 1A embodiment, the secondary 295 of transformer 292 applies voltage to coils 200). Since the current applied to the heating coils is constant, the heat emitted thereby is substantially constant and is radiated at a substantially constant rate. As the helium pressure in the main portion of the discharge tube 10 increases, the heat loss from thermistor 180 to the helium gas increases, the temperature of the thermistor decreases, its resistance increases and the voltage drop thereacross increases and reaches a steady state value at which time the voltage at the input terminals to operational amplifier 260 is substantially equal. The output of amplifier 260 is insufficient to maintain transistor 280 on. With transistor 280 off, no current is supplied to the positive terminal of relay 282 and the relay is switched such that the 115 volt line voltage is applied to transformer 292. The heater 162 of FIG. 1 (or the heater coils 200 of FIG. 1A) is therefore turned off and leakage of high pressure helium to the main portion laser tube 10 is substantially reduced (some leakage will occur due to the temperature of the discharge, convection and radiation losses etc.). It should be noted that thermistor 182 will only be slightly affected by helium pressure since it generates almost no heat of its own. This fact allows thermistor 182 to be placed within the laser tube near thermistor 180. Since the two thermistors are operating at different currents, it follows they will have different internal temperatures, thermistor 180 at approximately 150° C. and thermistor 182 at a temperature slightly higher than the helium temperature which corresponds to ambient temperature.

With this technique, it is possible to maintain the helium pressure within the laser discharge tube 10 at a desired value throughout the laser life time which may exceed 10,000 hours. The helium pressure can be maintained to within 0.3 to 0.4 Torr over a specified operating temperature range, for example, 60° F. to 120° F. Since there will be variations in thermistor characteristics, operational amplifiers tube pressures, and system electronics, a means of adjusting the circuit "balance" is required. As set forth hereinabove, by adjusting the voltage on line 289 by means of adjustable resistor 308 such initial circuit balance can be attained which sets the reference pressure equal to the sensed pressure. The heat generated by heater 162 (or by heating coils 200) does not effect the operation of the device to any great degree. However, heat baffles can be provided in the system to shield thermistors 180 and 182 from this heat if further accuracy is required.

Typical values for the principal elements shown in FIG. 6 are as follows:

256 = 300 ohms
262 = 30 K ohms
264 = 10 K ohms
268 = 2500 ohms
266 = 430 ohms
258 = 10 K ohms
220 = 10 K ohms
270 = 4.7 Megohms
274 = 0.002 microfarads
284 = 180 ohms
306 = 160 ohms
308 = 100 ohms
298 = 470 ohms Typical circuit elements which can be utilized include:

Thermistors 180 and 182—No. 35A1, 5000 ohms at 25° C. manufactured by Victory Engineering Corporation, Springfield, N.J.

260-Model No. 741CG manufactured by Signetics Corporation, Sunnyvale, Calif.

Transistor 280-2N 2222/3904 manufactured by Motorola Corporation, Phoenix, Ariz.

Solid State Relay 282 Model No. 226R1-5A1, manufactured by Sigma Corporation, Braintree, Mass.

Regulator 252-LM309H, National Semiconductor Corporation, Mountain View, Calif.

Transformer 292—12.8—2 (12 volts at 6 amperes), Signal Transformer, Inwood, N.Y.

Although not shown in the figure, it should be clear that alternate techniques can be utilized to sense the helium pressure in appendage 160 instead of thermistors. For example, a pirani type vacuum gage may be sealed into the low pressure helium section in appendage 160, the helium pressure sensed by the pirani gage being compared with a signal representing reference pressure.

If the sensed pressure is lower than the reference pressure, a power supply is caused to supply electric current to membrane heater 162 which heats the temperature sensitive permeable membrane 154 and allows helium in the high pressure reservoir 150 to leak into the main portion of the laser tube 10 until the pressure sensed by the pirani gage is equal to the reference value.

The anode mirror assembly comprises an apertured metal flange 42 having a fully reflecting mirror 30 sealed to metal flange 42. Mirror 30 typically comprises a glass substrate upon which is coated a substantially totally reflecting layer comprising a plurality of dielectric layers, the reflecting layer facing inward (within the tube envelope). The cathode end mirror assembly comprises an apertured metal flange 100 having a partially transmissive mirror 66 sealed to apertured metal flange 100 in a manner as described in the aforementioned copending patent application. Mirror 66 comprises a glass substrate upon which is coated a partially transmissive layer of dielectric material, the transmissive layer being positioned within tube envelope 12. Mirrors 30 and 66 are appropriately coated with layers of dielectric material such that only a laser beam of a desired wavelength (i.e. approximately 4416 Å) is transmitted by mirror 30, the beam being utilized by external apparatus such as for the scanning purposes as set forth hereinabove. Typical dielectric materials include $SiO_2$, $TlO_2$ among others.

As set forth hereinabove the cadmium reservoir is selected to provide a controllable laser output beam over a broad range of ambient temperatures e.g. 60° F. to 120° F. The cathodes are low cost directly heated barium strontium oxide cathodes typical of those utilized in flourescent lamps. The cathodes are thermally and chemically compatible with the laser tube and capable of providing the required discharge currents, typically in the range from about 20 ma to about 150 ma. The cathode end mirror 66 is protected by utilizing the diffusion confinement section 60 comprising the glass baffle 62 and tube 64, each of these elements providing diffusion confinement effects near the cathode end of the laser tube whereas anode end mirror 30 is protected by utilizing both cataphoretic and diffusion confinement sections 24 and 34, respectively, adjacent the anode end of the laser tube 10.

In the preferred embodiment, a few grams, typically 10–15 grams, of cadmium metal is inserted into reservoir 18 via tubulation 26. A heater 50 is provided to vaporize the cadmium to a preselected pressure and control the vapor pressure of the cadmium as described hereinabove. It should be noted tht the heat of the discharge generated between the anode and cathode may also cause vaporization of the cadmium.

Helium gas is introduced into envelope 12 at a preselected pressure (approximately 4.0 Torr) employing vacuum processing equipment and helium fill tubulation 320.

A solid cadmium charge 25 is deposited in reservoir 18 and tubulation 26 is selaed off prior to laser tube operation.

The operation of tube 10 is initiated by first heating the selected cathode filament 76 or 78 by applying e.g. 4 volts at 2 amperes being typical via transformer 120 thereto and therafter providing a high voltage via a source (not shown) of sufficient duration (2 to 5 microseconds) and amplitude (typically 20 kilovolts) between the anode 32 and the selected cathode electrode to cause the intervening gas to ionize. An external discharge power supply circuit 128 (FIG. 5) is then applied to the tube 10 to maintain electrical current in the discharge capillary tube 14 constant at a value determined by the tube design and selected to provide optimum intensity (output power). The cadmium reservoir control heater 50 is energized by applying approximately 50 watts thereto heat and evaporate the stored cadmium until the tube begins to lase. Preferably, the cadmium temperature is maintained at approximately 280° C., corresponding to its desired vapor pressure.

The discharge initiated between anode electrode 32 and cathode structure 52 via the current supply 128 excites the helium atoms to an energy state from which energy is imparted to the vaporized cadmium atoms. This causes the cadmium to be ionized and to be excited to the required energy levels required for lasing action. The ionized cadmium atoms are then transported along the length of the discharge confining bore tube 14 to cathode 78 (the selected cathode shown in FIG. 5) via the process of cataphoresis in a manner well known in the art. When the excited ionized cadmium atoms return to a lower energy state, laser radiation at 4416 Å (blue) is produced. Since the voltage drop across the laser tube 10 is inversely related to the cadmium vapor pressure, the system is self regulating once a proper cadmium temperature is established with the current from power supply 128. The cadmium vapor condenses as condensate 70 in the region 93 due to the cooler tube operation thereat. Note that a layer of insulation 322, such as abestos, may be provided around a portion of the laser envelope 12 to restrict the area of cadmium condensation between member 20 and member 68 (cadmium vapor may condense as condensate 70' in that region).

The cadmium vapor is distributed in capillary tube 14 near cathode structure 52 by cataphoretic pumping. In order to inhibit the cadmium vapor from condensing on mirror 66 due to the diffusion properties of cadmium atoms, capillary tube 64 is provided with a sufficient length (typically 1 inch) such that substantially all of the cadmium vapor will condense before reaching mirror 66. On the anode end of the laser tube assembly, a cataphoretic confinement section 24 inhibits cadmium ions from deposiiing on mirror 30 while diffusion section 34 also inhibits any cadmium atoms diffusing towards mirror 30 from condensing on the mirror. It should be noted that a small amount of cadmium vapor will be near the laser mirrors but the heat of the discharge heats the mirrors and the surrounding structure such that condensation on the mirrors does not occur. The voltage feedback control circuit, described hereinabove, senses the laser tube voltage and controls the amount of power dissipated in heater 50 to provide substantially constant laser output since laser output is dependent, inter alia, on the cadmium vapor pressure.

To further define the specifics of the present invention, the following examples are intended to illustrate and not limit the particulars of the present system. Parts and percentages are by weight unless otherwise indicated.

I. A glass envelope 12 having a optical resonant cavity spacing (mirror to mirror) in the range from 30 cm to about 60 cm and a diameter of 3.5 cm fabricated of borosilicate glass is provided with integral mirrors having a diameter of 15 mm at opposite ends sealed to the tube envelope with a hard glass frit seal more specifically defined in U.S. application Ser. No. 552,396. An anode comprised of Kovar, an iron-nickel-cobalt alloy is provided at one end of the tube, a pair of cathodes comprised of direct heated BaSrO filaments is provided at the other. A cadmium reservoir containing at least 10 gms and having a capacity of about 5 cm$^3$ is provided in close proximity to the anode along with cataphoretic confinement and diffusion confinement sections. A diffusion confinement section is located in close proximity to the cathode. Both the diffusion and the cataphoretic confinement section are employed to inhibit the cadmium vapor from reaching the mirrors at opposite ends of the tube. The discharge tube is coaxially mounted in the gas envelope which communicates between the anode and the cathode having an inside diameter of 1.9 mm and a tube wall thickness of 3 mm being fabricated of borosilicate glass. An appendage 160 is fabricated as part of the tube envelope 12 and the prefabricated helium pressure regulator 148 is joined thereto via appropriate flange members. Helium is filled into the gas envelope via tubulation 320 using conventional techniques and the helium is maintained at a substantially constant pressure of 4 Torr by utilizing the helium pressure regulator and control circuitry as described hereinabove. A discharge is struck between the anode and the cathode employing conventional discharge ignition techniques and the discharge is maintained at approximately 100 milliamps by current source 128. A resistive heater 50 wrapped around the cadmium reservoir is energized to provide cadmium vapor at a pressure about $10^{-2}$ Torr in the space of the reservoir which diffuses into the main capillary discharge tube 14 along with helium gas. The helium and cadmium atoms collide providing ionization and excitation of the cadmium and thereby providing for stimulated emission of the appropriate wavelength. Cadmium ion density is maintained with reasonable uniformity in the discharge tube as the cadmium ions flow from the cadmium reservoir towards the cathode by cataphoresis. Thus, continuous wave blue light is emitted at 4416 Å measured by spectroscopic means. Baffle member 68 minimizes the gettering of helium by the cadmium condensate 70 since the cadmium condensate 70 is not affected by the electric field at the selected cathode 76 or 78.

II. The procedure as outlined in Example 1 is again performed with the exception that helium pressure is 5 Torr and the cadmium is $10^{-1}$ Torr.

III. The procedure as outlined in Example 2 is again performed with the exception that the cadmium pressure is $10^{-2}$ Torr.

IV. The procedure as outlined in Example 2 is again performed with the exception that the cadmium pressure is $10^{-3}$ Torr.

V. The procedure as outlined in Example 1 is again performed with the exception that the helium pressure is 7 Torr and the cadmium pressure is $10^{-1}$ Torr.

VI. The procedure as defined in Example 1 is again performed with the exception that the helium pressure is 7 Torr.

VII. The procedure as defined in Example 1 again performed with the exception that the helium pressure is 7 Torr and the cadmium pressure is $10^{-3}$ Torr.

VIII-XV. The procedure as outlined in Example 1 is again performed with the exception that the discharge current is employed at 50, 60, 70, 80, 90, 110, and 120 milliamperes.

It should be noted that although the technique for introducing high pressure helium within glass envelope 12 to compensate for helium pressure loss has been described with specific reference to helium-cadmium lasers, the technique can also be adapted for utilization in gas lasers wherein there may be substantial gas depletion during tube operation or shelf times, such as, for example, in helium-selenium, helium-neon, krypton and xenon lasers.

While the invention has been described with reference to its preferred embodiment it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A gas laser comprising an envelope; a gaseous medium disposed within said envelope, said medium comprising a mixture of first and second components; said first gas component initially being at a first pressure value; at least one anode and one cathode disposed within said envelope; means disposed at opposite ends of said gas laser envelope for forming an optical resonant cavity; means for applying a potential between said anode and cathode to provide a discharge in said gaseous medium which results in stimulated emission gain for continuous wave generation of laser radiation; a controllable source of said first gas mixture component; means for controlling the pressure of said second gas mixture component; means for generating a signal when the pressure of said first gas component within said envelope falls below a second pressure value; and means responsive to said generated signal for controlling said controllable source, wherein said first gas component is released within said gas envelope such that the pressure of said first gas component is increased to substantially said first pressure value.

2. The gas laser as defined in claim 1 wherein said controllable source comprises a member for storing said first gas component, a portion of said storing member comprising a member permeable to said first gas component, the permeability thereof being dependent on its temperature; and heater means adjacent said permeable member, said heater being coupled to said responsive means whereby the release of said first gas component within said gas envelope is controlled.

3. The gas laser as defined in claim 1 wherein the pressures of said first and second gas mixture components are controlled independently of each other.

4. A gas laser comprising an envelope; a gaseous medium disposed within said envelope, said medium comprising a mixture of first and second components; said first gas component initially being at a first pressure value; at least one anode and one cathode disposed within said envelope; means disposed at opposite ends of said gas laser envelope for forming an optical resonant cavity; means for applying a potential between said anode and cathode to provide a discharge in said gaseous medium which results in stimulated emission gain for continuous wave generation of laser radiation; a controllable source of said first gas mixture component; means for controlling the pressure of said second gas mixture component; means for generating a signal when the pressure of said first gas component within said envelope falls below a second pressure value; said second pressure value being less than said first pressure value; and means responsive to said generated signal for controlling said controllable source, wherein said first gas component is released within said gas envelope such that the pressure of said first gas component is increased to substantially said first pressure value, said generating means having at least first and second input terminals, the magnitude of the voltage applied to said input terminals being dependent on the resistance values of first and second thermistors coupled to said first and second input terminals, respectively, the resistance values of said first and second thermistors within a predetermined temperature operating range being selected such that the difference between the voltage at said first and second input terminals is substantially equal to zero, said first and second thermistors being placed in an operative relationship to said gas envelope, said first thermistor being primarily sensitive to the pressure of said first gas component within said envelope and said second thermistor being primarily sensitive to temperature.

5. The gas laser as defined in claim 4 wherein said first thermistor is supplied with current of a first value and said second thermistor is supplied with current of a second value, said first current value being greater than said second current value.

6. The gas laser as defined in claim 4 wherein ambient temperature effects are compensated for by utilization of said first and second thermistors.

* * * * *

Disclaimer 4,224,579.—*Calvin Jon Marlett*, La Crescenta; *Edwin A. Reed*, Upland; *Richard C. Johnson* and *William F. Hug*, Pasadena, Calif. METAL VAPOR LASER DISCHARGE TUBE. Patent dated Sept. 23, 1980. Disclaimer filed Apr. 2, 1984, by the assignee, *Xerox Corp.*

Hereby enters this disclaimer to claims 1–3 of said patent.

[*Official Gazette May 22, 1984.*]